(12) United States Patent
Dove et al.

(10) Patent No.: US 8,692,703 B1
(45) Date of Patent: Apr. 8, 2014

(54) MAPPING, STORAGE, RETRIEVAL AND DISPLAY OF HIGH ENERGY ELECTROMAGNETIC RADIATION EMITTERS

(75) Inventors: Richard S. Dove, Palm Bay, FL (US); Scott F. Bauler, Melbourne, FL (US); Randy H. Jacobson, Melbourne, FL (US); Kirschen A. Seah, Cedar Rapids, IA (US); Eamon P. Hegerty, Melbourne, FL (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 291 days.

(21) Appl. No.: 12/884,530

(22) Filed: Sep. 17, 2010

(51) Int. Cl.
*G01S 7/36* (2006.01)
(52) U.S. Cl.
USPC .................................. 342/13; 342/14; 342/36
(58) Field of Classification Search
USPC ................................ 342/13, 14, 36, 176, 181
See application file for complete search history.

(56) References Cited

U.S. PATENT DOCUMENTS

| | | | |
|---|---|---|---|
| 5,287,110 A * | 2/1994 | Tran ................................. | 342/13 |
| 5,631,640 A * | 5/1997 | Deis et al. ...................... | 340/961 |
| 6,266,610 B1 * | 7/2001 | Schultz et al. ................. | 701/528 |
| 6,917,880 B2 * | 7/2005 | Bergin et al. .................. | 701/514 |
| 7,194,353 B1 * | 3/2007 | Baldwin et al. ............... | 701/528 |
| 7,512,462 B2 * | 3/2009 | Nichols et al. ..................... | 701/3 |
| 2008/0169959 A1 * | 7/2008 | Gounalis ........................ | 342/20 |
| 2008/0180325 A1 * | 7/2008 | Chung et al. .................. | 342/451 |

* cited by examiner

*Primary Examiner* — John B Sotomayor
*Assistant Examiner* — Marcus Windrich
(74) *Attorney, Agent, or Firm* — Donna P. Suchy; Daniel M. Barbieri

(57) ABSTRACT

A system for providing the capability for a vehicle to avoid regions of signal interference from high energy (HE) electromagnetic (EM) radiation emitters. The system includes a processing module. A database is operatively connected to the processing module. The database comprises a plurality of geographical areas affected by HE EM radiation emitters and data associated with the geographical areas. The data includes location, lateral and vertical extents, and signal attenuation for selected geographical areas affected by HE EM radiation emitters. The data preferably also includes affected frequency spectrum for the selected geographical areas. A display system is operatively connected to the processing module. The processing module functions to receive information regarding the position of the vehicle and query the database to retrieve relevant HE EM radiation emitters which are a threat to the vehicle's ability to properly navigate or communicate. The relevant HE EM radiation emitters are displayed on the display system. The present invention provides enhanced situational awareness to the pilot and permits decision support systems to refine their trajectory through hazards.

14 Claims, 1 Drawing Sheet

MAPPING, STORAGE, RETRIEVAL AND DISPLAY OF HIGH ENERGY ELECTROMAGNETIC RADIATION EMITTERS

BACKGROUND OF THE INVENTION

1. Field of the Invention

The present invention relates generally to navigation and communication devices for vehicles, and more particularly to vehicle avoidance of regions having signal interference from high energy (HE) electromagnetic (EM) radiation emitters.

2. Description of the Related Art

Radio based navigation and communications devices such as automatic direction finders (ADF), very high frequency (VHF) and high frequency (HF) radios and Global Navigation Satellite System (GNSS) devices are vulnerable to signal interference from high energy (HE) electromagnetic (EM) radiation emitters. Vehicles entering regions of interference by these HE EM radiation emitters may experience impaired ability to navigate and communicate using radio-based navigation and communications devices.

Government agencies are typically responsible for making sure that EM radiation emitters do not interfere with navigation and communication receivers which are compliant with their individual interference specifications, when those receivers are used with specified stations at specified frequencies and within specified volumes and routes.

To achieve additional performance, economy, or to avoid various threats, it is desired that vehicles be able to depart from routings where interference-controlled paths have been previously determined. Presently, vehicles are neither able to determine such routings on their own using prescribed frequencies and stations, nor can they determine interference-controlled routings to the desired destination using alternative frequencies and stations.

SUMMARY OF THE INVENTION

In a broad aspect, the present invention is a system for providing the capability for a vehicle to avoid regions of signal interference from high energy (HE) electromagnetic (EM) radiation emitters. The system includes a processing module. A database is operatively connected to the processing module. The database comprises a plurality of geographical areas affected by HE EM radiation emitters and data associated with the geographical areas. The data includes location, lateral and vertical extents, and signal attenuation for selected geographical areas affected by HE EM radiation emitters. The data preferably also includes affected frequency spectrum for the selected geographical areas. A display system is operatively connected to the processing module. The processing module functions to receive information regarding the position of the vehicle and query the database to retrieve relevant HE EM radiation emitters which are a threat to the vehicle's ability to properly navigate or communicate. The relevant HE EM radiation emitters are displayed on the display system.

In one preferred embodiment, a flight management system (FMS) is operatively connected to the processing module. The operative connection comprises a communications channel between the FMS and the processing module. The processing module retrieves an initial flight plan from the FMS and determines the threats based on locations or routes presented to it from the FMS. The processing module returns a list of HE EM radiation emitters to the FMS in response to the retrieved flight plan. The FMS computes a new flight plan in response to the determination of threats from the processing module. The FMS sends information to the display system for display of the new flight plan.

In another embodiment, the processing module and the database are both contained within a processor contained within an FMS.

The present invention provides enhanced situational awareness to the pilot and permits decision support systems to refine their trajectory through hazards.

DETAILED DESCRIPTION OF THE INVENTION

Figure 1:
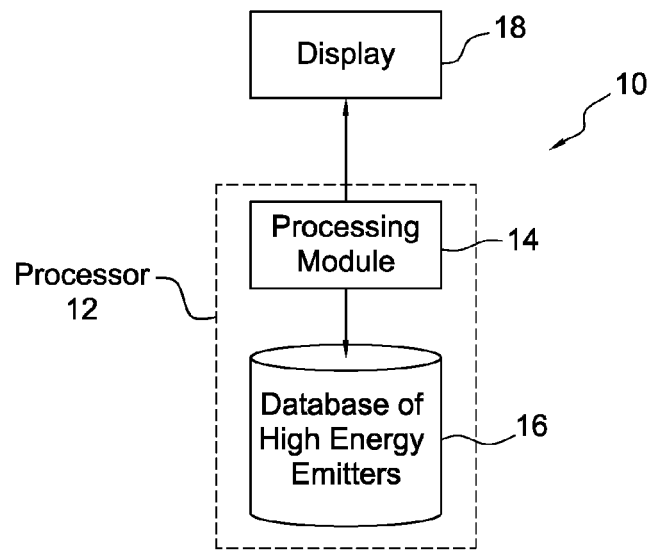
FIG. 1 is a schematic illustration of a first embodiment of the system for providing the capability for a vehicle to avoid regions of signal interference from high energy (HE) electromagnetic (EM) radiation emitters.

Referring now to the drawings and the characters of reference marked thereon, FIG. 1 illustrates the system for providing the capability for a vehicle to avoid regions of signal interference from high energy (HE) electromagnetic (EM) radiation emitters, the system being designated generally as 10. The system 10 includes a processor, designated generally as 12, containing a processing module 14 and a database 16. The database 16 is operatively connected to the processing module 14. The database comprises a plurality of geographical areas affected by HE EM radiation emitters and data associated with the geographical areas. The data includes location, lateral and vertical extents, and signal attenuation for selected geographical areas affected by HE EM radiation emitters. The data also preferably includes affected frequency spectrum. A display system 18 is operatively connected to the processing module. The processing module functions to receive information regarding the position of the vehicle and query the database to retrieve relevant HE EM radiation emitters which are a threat to the vehicle's ability to properly navigate or communicate. The relevant HE EM radiation emitters are displayed on the display system.

HE EM radiation emitters of concern are those which are of a level, or a combination of levels for multiple emitters, which constitute an interference threat to the use of navigation or communication stations for vehicles operating within those areas while using specific frequencies and stations. The HE EM radiation emitters may be, for example, broadcast television towers, broadcast radio, cellular phone towers, microwave repeater stations, ground-based radar stations, radio relay antennas, or other emitters sharing the same frequency (e.g. co-channel emitters). An interferer can be any transmitter, or combination of transmitters, which can produce a signal, either separately or jointly, which degrades a receiver's ability to detect and process the desired station on the desired frequency, at levels above which the receiver is designed to reject such interference. The interference can be from another service in another frequency band, from nearby frequencies, possibly within the frequency band of the desired service, or overlapping the desired signal on the same frequency (co-channel).

The processing module 14 may be implemented in a special purpose device, or may be in the form of a stored program executable by a general purpose or special purpose computer. This may be integrated with systems that perform other functions. The processing could be in the form of an algorithm which can determine the level of the interference to a given station at a given frequency that is likely to be produced at any specified location by the various HE EM radiation emitters. The processing could take into account the calculated level of the desired signal versus the calculated level of the various HE EM radiation emitters, and the level of the combined products produced by those emitters in combination. The calculation could involve the frequencies, transmitted power, time of operation, duty cycle of the transmissions, the antenna pattern, encoding, and/or the type of signal transmitted by each emitter.

The database 16 can contain, for example, the location of the transmitting antenna (lat/long and effective radiation altitude), transmitted power, antenna pattern (including scheduled changes to power and antenna pattern), the type of signal emitted (bandwidth, duty cycle, emission type), and any details which might make that specific emitter a special threat.

Figure 2:
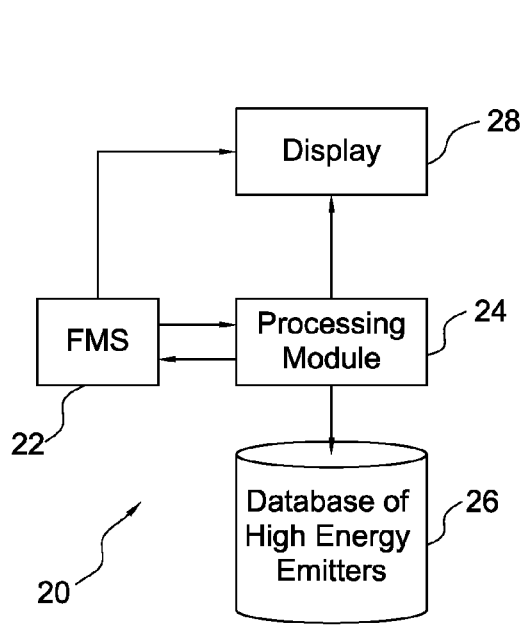
FIG. 2 is a schematic illustration of the system in an avionics system.

Referring now to FIG. 2, an implementation of the present invention with an avionics system for an aircraft is illustrated, designated generally as 20. In this embodiment, a flight management system (FMS) 22 is operatively connected to the processing module 24 via a communications channel between the FMS 22 and the processing module 24. A database 26 is operatively connected to the processing module 24. The processing module 24 retrieves an initial flight plan from the FMS 22. The processing module 24 returns a list of HE EM radiation emitters in response to the retrieved flight plan.

Typically, the processing module 24 uses the flight plan from the FMS 22 to determine areas where interference could occur along the route and region between the present or initial position and destination. The FMS 22, itself, would not do the calculations of possible interference based on the emitters from the database, but would use the results from the processing module 24 to know if the selected route or others it might specify would be interference-controlled. For the system represented in FIG. 2, the FMS 22 would typically be largely unchanged and would only receive confirmation that the selected route is interference-controlled or not.

Alternatively, the system could be designed so that the FMS 22 could compute a new flight plan in response to the returned list of HE EM radiation emitters. The FMS 22 would send information to the display system 28 for display of the new flight plan.

Figure 3:
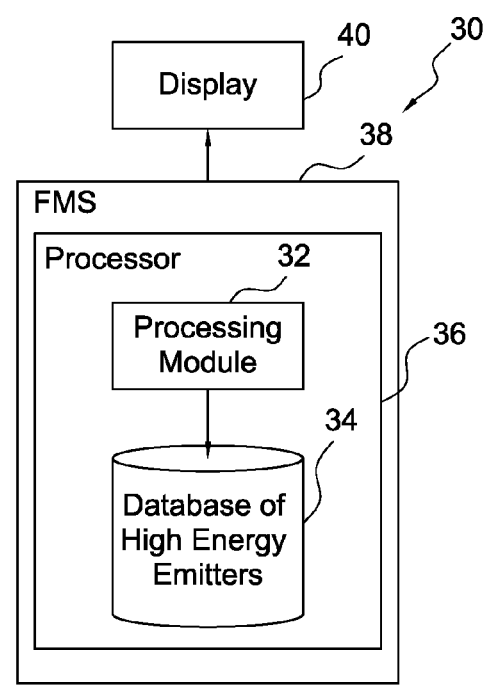
FIG. 3 illustrates implementation within a flight management system (FMS).

Referring now to FIG. 3, an alternative avionics application is illustrated, designated generally as 30. In this embodiment, the processing module 32 and the database 34 are both contained within a processor 36 contained within an FMS 38. The FMS 38 is operatively connected to the display system 40. In the system of FIG. 3, the determination of the extent of possible interference could be integral to the selection of the routing itself, within the FMS 38.

In the various embodiments, the processing module may provide information to the display system for drawing the bounds of the HE EM radiation interference areas in a variety of different ways. These boundaries may depend on, for example, altitude and/or location. Different kinds of interference could be depicted by, for example, color distinctions, shading, contour dashing, and/or other symbolic representations. These depictions enable the vehicle's pilot to be aware of regions of interference and steer away from them.

Decision support systems could access the database and plot a trajectory which would be clear of any interference or one that would minimize any interference.

These extents and EM radiation information can typically be obtained from the ITU (International Telecommunications Union) or from each of the individual countries' telecommunications authorities. Such information has been used to ensure that the defined airways are interference-controlled, meaning that off-airways flight would be subject to potential interference hazards. Where the information is unavailable, the aircraft avionics may maintain a log of any areas where interference is encountered. The new data could be used to augment the existing database as well as be shared and corroborated to make future updates to the database (i.e. refine the interference map).

In order for data to be usefully retrieved, it should be stored in the database in such a way to permit retrieval via position (latitude/longitude or some other coordinate system), altitude, frequency spectrum and type of EM radiation. A geographical database is the recommended database system since it allows for rapid retrieval by position.

Areas in which navigation and communication can be performed with specified combinations of desired stations could be determined and routes through such areas to the desired destination or alternatives could be determined. Decisions could be made, for example, on what ATC frequency to display in a given sector (usually retrieved only on loss of communication with the prior controller), possibly recommending a frequency in a given location that is not the broad frequency normally assigned for the entire sector.

FMS systems typically blend multiple navigation sources, weighting sources which produce higher accuracy and/or integrity more highly than sources which produce, or are likely to produce, less accurate results or ones which could degrade the integrity of the solution.

At present, FMS systems cannot predict which navigation sources might have been corrupted by interference, which might become interfered with along the present route, and which routes might provide sufficiently interference free signals. The present invention provides a solution to this problem.

Although particularly adaptable for use in an aircraft environment, the present invention may have broad application for a variety of applications in which avoidance of HE EM radiation emitters is desired. For example, it can be used for shipping applications as well.

Other embodiments and configurations may be devised without departing from the spirit of the invention and the scope of the appended claims.

The invention claimed is:

1. A system for providing the capability for a vehicle to avoid regions of signal interference from high energy (HE) electromagnetic (EM) radiation emitters, comprising:
   a) a processing module;
   b) a database operatively connected to said processing module, said database comprising a plurality of geographical areas affected by HE EM radiation emitters and data associated with said geographical areas, said data including location, lateral and vertical extents, and signal attenuation for selected geographical areas affected by HE EM radiation emitters;
   c) a display system operatively connected to said processing module, wherein said processing module is configured to receive information regarding the position of the vehicle and query the database to retrieve relevant HE EM radiation emitters which are a signal interference threat to the vehicle's ability to properly navigate or communicate, said relevant HE EM radiation emitters being displayed on said display system; and,
   d) a flight management system (FMS) operatively connected to said processing module, wherein said relevant HE EM radiation emitters are determined by processing specific characteristics of the HE EM radiation emitters in said database and the level of the combined products produced by those emitters in combination, wherein said HE EM radiation emitters are selected from the group, consisting of: broadcast television towers, broadcast radio, cellular phone towers, microwave repeater stations, ground-based radar stations, radio relay antennas, and co-channel emitters, wherein said processing module is configured to use a flight plan from said FMS to determine areas where interference could occur along the route and region between the present or initial position and destination, said FMS not doing calculations of possible interference based on the emitters from the database, but using results from the processing module to determine if the selected route or others it might specify would be interference-controlled.

2. The system of claim 1, wherein said data in said database further comprises the affected frequency spectrum for said selected geographical areas.

3. The system of claim 1, wherein said processing module and said database are both contained within a processor.

4. The system of claim 1, wherein said operative connection comprises a communications channel between said FMS and said processing module wherein: a) said processing module retrieves an initial flight plan from said FMS and determines the threats based on locations or routes presented to it from said FMS; b) said processing module returns a list of HE EM radiation emitters to said FMS in response to said retrieved flight plan; c) said FMS computes a new flight plan in response to said determination of threats from said processing module; and, d) said FMS sends information to said display system for display of said new flight plan.

5. The system of claim 1, wherein said processing module and said database are both contained within a processor, said processor contained within said flight management system (FMS).

6. The system of claim 1, wherein said processing module provides information to said display system for depicting said relevant HE EM radiation emitters in terms of color distinctions, shading, contour dashing, and/or other symbolic representations.

7. The system of claim 1, wherein said processing module provides information to said display system for depicting said relevant HE EM radiation emitters in terms of altitude and/or location.

8. A method for providing the capability for a vehicle to avoid regions of signal interference from high energy (HE) electromagnetic (EM) radiation emitters, comprising the steps of:

a) providing a database including a plurality of geographical areas affected by HE EM radiation emitters and data associated with said geographical areas, said data including location, lateral and vertical extents, and signal attenuation for selected geographical areas affected by HE EM radiation emitters;

b) receiving information regarding the position of the vehicle and querying said database to retrieve relevant HE EM radiation emitters which are a signal interference threat to the vehicle's ability to properly navigate or communicate, utilizing a processing module; and, c) displaying said relevant HE EM radiation emitters, wherein said relevant HE EM radiation emitters are determined by processing specific characteristics of HE EM radiation emitters in said database and the level of the combined products produced by those emitters in combination, wherein said HE EM radiation emitters are selected from the group, consisting of: broadcast television towers, broadcast radio, cellular phone towers, microwave repeater stations, ground-based radar stations, radio relay antennas, and co-channel emitters, wherein said processing module is configured to use a flight plan from a flight management system (FMS) operatively connected to said processing module to determine areas where interference could occur along the route and region between the present or initial position and destination, said FMS not doing calculations of possible interference based on the emitters from the database, but using results from the processing module to determine if the selected route or others it might specify would be interference-controlled.

9. The method of claim 8, wherein said step of providing a database includes providing a database further including the affected frequency spectrum for said selected geographical areas.

10. The method of claim 8, wherein said processing module and said database are both contained within a processor.

11. The method of claim 8, wherein said flight management system (FMS) is operatively connected to said processing module, said operative connection comprising a communications channel between said FMS and said processing module, a) wherein said processing module operates by the steps of:
   a) retrieving an initial flight plan from said FMS; and,
   b) returning a list of HE EM radiation emitters to said FMS in response to said retrieved flight plan; and, b) wherein said FMS operates by the steps of:
   a) computing a new flight plan in response to determination of threats from said processing module; and,
   b) sending information to said display system for displaying said new flight plan.

12. The method of claim 8, wherein said processing module provides information to said display system for depicting said relevant HE EM radiation emitters in terms of color distinctions, shading, contour dashing, and/or other symbolic representations.

13. The method of claim 8, wherein said processing module provides information to said display system for depicting said relevant HE EM radiation emitters in terms of altitude and/or location.

14. A system for providing the capability for an aircraft to avoid regions of signal interference from high energy (HE) electromagnetic (EM) radiation emitters, comprising:

a) a processing module positioned on an aircraft;

b) a database operatively connected to said processing module, said database comprising a plurality of geographical areas affected by HE EM radiation emitters and data associated with said geographical areas, said data including location, lateral and vertical extents, and signal attenuation for selected geographical areas affected by HE EM radiation emitters;

c) a display system operatively connected to said processing module, wherein said processing module is configured to receive information regarding the position of the aircraft and query the database to retrieve relevant HE EM radiation emitters which are a signal interference threat to the aircraft's ability to properly navigate, said relevant HE EM radiation emitters being displayed on said display system; and, d) a flight management system (FMS) operatively connected to said processing module, wherein said relevant HE EM radiation emitters are determined by processing specific characteristics of HE EM radiation emitters in said database and the level of the combined products produced by those emitters in combination, wherein said HE EM radiation emitters are selected from the group, consisting of: broadcast television towers, broadcast radio, cellular phone towers, microwave repeater stations, ground-based radar stations, radio relay antennas, and co-channel emitters, wherein said processing module is configured to use a flight plan from said FMS to determine areas where interference could occur along the route and region between the present or initial position and destination, said FMS not doing calculations of possible interference based on the emitters from the database, but using results from the processing module to determine if the selected route or others it might specify would be interference-controlled.

* * * * *